US006332426B1

(12) United States Patent
van den Berg

(10) Patent No.: US 6,332,426 B1
(45) Date of Patent: Dec. 25, 2001

(54) IMPLEMENT FOR FEEDING ANIMALS

(75) Inventor: Karel van den Berg, Bleskensgraaf (NL)

(73) Assignee: Lely Research Holding A.G. A Swiss Limited Liability (CH)

( * ) Notice: Subject to any disclaimer, the term of this patent is extended or adjusted under 35 U.S.C. 154(b) by 0 days.

(21) Appl. No.: 09/642,833

(22) Filed: Aug. 22, 2000

Related U.S. Application Data

(63) Continuation of application No. PCT/NL99/00758, filed on Dec. 10, 1999.

(30) Foreign Application Priority Data

Oct. 24, 1998 (NL) .................................................. 1010899

(51) Int. Cl.[7] .................................................. A01K 29/00
(52) U.S. Cl. ...................................... 119/51.01; 29/564.3
(58) Field of Search ..................... 119/51.01, 56

(56) References Cited

U.S. PATENT DOCUMENTS 5,228,628 * 7/1993 Temburg et al. .................. 241/101.4
5,318,399 * 6/1994 Marom ................................ 414/412
5,371,938 * 12/1994 Martin ................................. 29/564.3

FOREIGN PATENT DOCUMENTS

29706453 U1   4/1997   (DE) .
0432702 A2   6/1991   (EP) .
0704156 A1   4/1996   (EP) .

* cited by examiner

Primary Examiner—Thomas Price
(74) Attorney, Agent, or Firm—Penrose Lucas Albright

(57) ABSTRACT

An apparatus for feeding animals provided with a supply channel which receives wrapped feed bales and sequentially delivers them one by one by gravity to a location wherein they are held and a plastic wrapper is removed from them by a severing element. The plastic wrapping is seized by two side-by-side cylinders which discharge it through a discharge conduit. The wrapper is severed by a wire cutter suspended from a framework surrounding the bale therein, the cutter being suspended from springs and connected on each end to motors for reciprocating same. Optionally, the cutter wire can be heated. The bale is held in place during the cutting operation and then released to be received by cutting elements that cut the fodder therein to dimensions which can be consumed by the animals. A delivery mechanism including a nozzle carries the cut fodder to stalls to be consumed by the animals. The delivery mechanism includes magnetic device or devices which may be electromagnets for removing pieces of metal which may be mixed with the fodder.

25 Claims, 1 Drawing Sheet

IMPLEMENT FOR FEEDING ANIMALS

This appln is a continuation of PCT/NL99/00758, filed Dec. 10, 1999.

The invention relates to an implement as claimed in the preamble of claim 1. In such implements roughage, silage or concentrate is supplied to the animals. In this situation roughage and silage are usually supplied in the form of a substantially cylindrical feed bale with a plastic wrapper. Before the animals are able to consume the feed bale, the wrapper has to be removed manually therefrom.

The invention aims at providing an improved implement. According to the invention, this is achieved by means of the measures mentioned in the characterizing part of claim 1. In this manner the feed bales can be processed fully automatically.

The invention will be explained in further detail with reference to the accompanying drawings.

Figure 1:
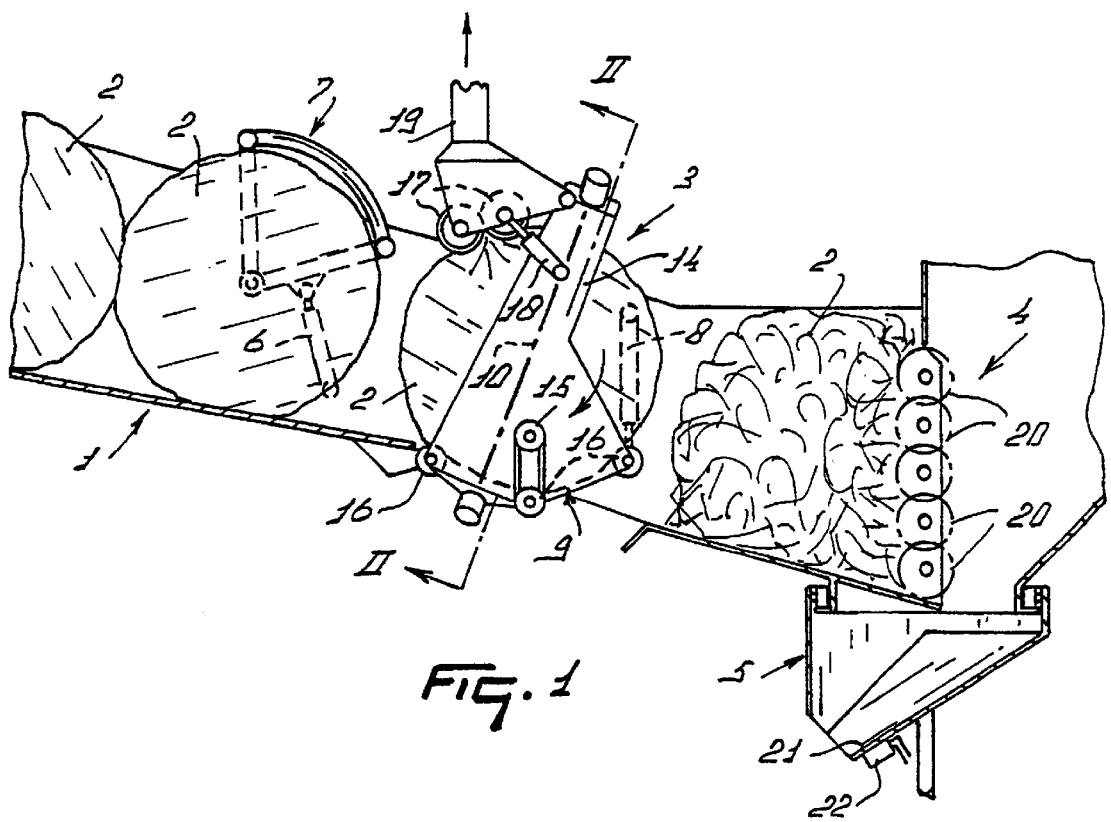
FIG. 1 is a schematic side view of an implement according to the invention.

FIG. 1 shows schematically a side view of an implement according to the invention. The implement comprises a sloping supply channel 1 for wrapped (e.g. cylindrical) feed bales 2, means 3 for removing the wrapper from a feed bale 2, means 4 for bringing fodder out of the feed bale 2 into a form which is suitable for consumption, and means 5 for supplying the fodder which has been brought into a consumable form to a feeding stall (non-shown and known per se) for the animals to be fed.

The supply channel 1 is provided with an element 7 in the shape of a cylinder casing segment for supplying each time one feed bale 2 to the means 3 for removing the wrapper from a feed bale 2, said element 7 being pivotable by means (of a) control element 6. The control element 6 may be constituted by a hydraulic cylinder, one end of which is connected with the supply channel 1 and whose other end is connected with the element 7. By reciprocating the cylinder 6 (to be operated manually or automatically, e.g. in a computer-controlled manner), the element 7 can be pivoted between a first position, shown in FIG. 1, in which the most right hand one of the bales 2 in the supply channel 1 is stopped, and a second position, in which the most right hand feed bale 2 is released, so that the latter is allowed to roll into the means 3 for removing the wrapper from a feed bale 2. In the second position of the element 7, the other bales 2 in the supply channel 1 are stopped. When the element 7 is pivoted back into the first position, the other bales 2 in the supply channel 1 move up to the right.

The means 3 for removing the wrapper from a feed bale 2 are provided with a floor element 9, which can be tilted by means (of a) further control element 8 for receiving each time one wrapped feed bale 2 and supplying same, after the wrapper has been removed therefrom, to the means 4 for bringing fodder out of the feed bale 2 into a form which is suitable for consumption. The control element 8 may be constituted by a hydraulic cylinder, one end of which is rigidly connected with the implement and whose other end is connected with the floor element 9. By reciprocating the cylinder 8 (to be operated manually or automatically, e.g. in a computer-controlled manner), the element 9 can be tilted between a first position shown in FIG. 1, in which the bale 2 is stopped, and a second position, in which the bale 2 is released, so that the latter is allowed to roll into the means 4 for bringing fodder out of the feed bale 2 into a form which is suitable for consumption. When the element 9 is tilted back into the first position, a next bale 2 can be received from the supply channel 1.

Figure 2:
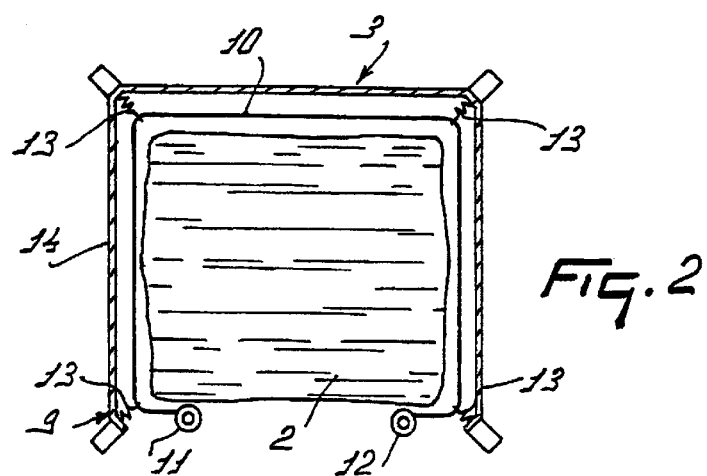
FIG. 2 is a schematic cross-section of the implement of FIG. 1 according to the arrows II—II.

The means 3 for removing the wrapper from a feed bale 2 are provided with means for cutting the wrapper. This will be explained in further detail in the following with reference to FIG. 2 showing schematically a cross-section of the implement of FIG. 1 according to the arrows II—II. A cutting element 10, which can be put under tension against the wrapper of the feed bale 2 or around the wrapper of the feed bale 2, extends for the greater part around the feed bale 2. For that purpose, the cutting element 10, e.g. a cutting thread, is connected at one end with a first motor 11 and at the other end with a second motor 12. At the corners of the bale 2 the cutting thread 10 makes each time a bend. At these points the cutting thread is suspended from a framework 14 via spring elements 13. The motors 11, 12 are able to put the thread 10 under tension against spring action of the spring elements 13. With the aid of the spring elements 13, the cutting thread 10 comes loose from the bale 2 after cutting. In an embodiment of the invention, the cutting thread 10 may be connected with (non-shown) means for heating the cutting thread 10. This has a favourable influence on the cutting process. This can also be achieved by reciprocating the cutting element 10, e.g. with the aid of the motors 11 and 12.

In the embodiment shown in FIG. 1, the means 3 for removing the wrapper from a feed bale 2 are provided with means for rotating the feed bale 2, e.g. constituted by rollers 16 that are driven with the aid of a motor 15. Especially in the case of cylindrical bales 2, the removal of the wrapper can be facilitated by rotating the bale 2.

The means 3 for removing the wrapper from a feed bale 2 are further provided with means for stripping the wrapper from the feed bale 2. The latter means comprise two cylindrical rollers 17, which are almost touching each other and which are rotatable in opposite directions. The wrapper cut loose from a bale 2 is gripped by these rollers 17 and stripped from the bale 2 while the latter is rotating. The rollers 17 may be fitted to the framework 14 in such a manner that they can be pivoted away with the aid of a cylinder 18, so as not to impede a feed bale 2 rolling out of the supply channel 1. Finally the means 3 for removing the wrapper from a feed bale are provided with a device for discharging the wrapper, e.g. constituted by an extractor hood 19 disposed in the vicinity of the rollers 17.

The means 4 for bringing fodder out of the feed bale 2 into a form which is suitable for consumption comprise a row of co-operating cutting elements 20 which are known per se. In a further, non-shown embodiment, the means 4 for bringing fodder out of the feed bale 2 into a form which is suitable for consumption comprise a number of rotatable knives or rotatable cutters. If desired, the bale 2 can be orientated into a position which is advantageous for cutting fodder.

The means 5 for supplying the fodder that has been brought into a consumable form to the feeding stall comprise a controllable nozzle 21. With the aid of said nozzle 21 (to be rotated or translated manually or automatically, e.g. by means of a computer), the fodder may be distributed among various (non-shown) feeding troughs. The nozzle may be provided with means for intercepting substances in the fodder that are unfit for consumption, such as particles consisting of metal. The latter means may comprise a magnet 22 (or an electromagnet or a reel). Because of the fact that the magnet 22 is directly fitted to the nozzle 21, the disturbing particles can be removed efficiently.

It is remarked that the device for removing the wrapper from a wrapped bale 2 may be used per se also independently of the feeding implement described and for other applications and types of bales.

The entire implement (and also parts thereof) may be controlled automatically (e.g. with the aid of a computer or another control unit) or manually. Furthermore, the entire implement (and also parts thereof) may be designed movably.

Having disclosed my invention, what I claim is new and to be secured by Letters Patent of the United States of America is:

1. An implement for feeding animals which comprises a supply channel for receiving wrapped feed bales, unwrapping means for removing a wrapper from a feed bale at an unwrapping site, cutting means for cutting fodder in the feed bale into dimensions suitable for consumption, and delivery means for delivering the fodder that has been cut into dimensions suitable for consumption to a feeding stall for the animals to be fed, said supply channel being provided with control means for sequentially supplying one feed bale to said unwrapping means for removing said wrapper from said feed bale, said control means comprising a pivotable element in the shape of a cylindrical casing segment.

2. An implement for feeding animals which comprises a supply channel for receiving wrapped feed bales, unwrapping means for removing a wrapper from a feed bale at an unwrapping site, cutting means for cutting fodder in the feed bale into dimensions suitable for consumption, and delivery means for delivering fodder that has been cut into dimensions suitable for consumption to a feeding stall for the animals to be fed, said unwrapping means comprising control means for retaining a bale at said unwrapping site as it is being unwrapped and then releasing the unwrapped bale to be received by said cutting means, said control means comprising a tiltable floor element.

3. An implement for feeding animals which comprises a supply channel for receiving wrapped feed bales, unwrapping means for removing a wrapper from a feed bale at an unwrapping site, cutting means for cutting fodder in the feed bale into dimensions suitable for consumption, and delivery means for delivering the fodder that has been cut into dimensions suitable for consumption to a feeding stall for the animals to be fed, said unwrapping means comprising severing means for cutting said wrapper, said severing means comprising a cutting element that extends around the major part of a feed bale at said unwrapping means.

4. An implement in accordance with claim 3 wherein said cutting element is connected with tensioning means for placing said cutting elements under tension relative to said wrapper.

5. An implement in accordance with claim 4 wherein said tensioning means comprises a first motor connected to one end of said cutting element and a second motor connected to the other end of said cutting element, said cutting element including at least one bend therein, the implement further comprising a framework and a spring element interconnecting said framework with said cutting element, said spring element suspending said cutting element from said framework.

6. An implement in accordance with claim 3 comprising reciprocating means, said cutting element being connected to said reciprocating means.

7. An implement in accordance with claim 3 wherein said cutting element is heated.

8. An implement for feeding animals which comprises a supply channel for receiving wrapped feed bales, unwrapping means for removing a wrapping from a feed bale at an unwrapping site, cutting means for cutting fodder in the feed bale into dimensions suitable for consumption, and delivery means for delivering fodder that has been cut into dimensions suitable for consumption to a feeding stall for the animals to be fed, said unwrapping means comprising stripping means for stripping the wrapper from said feed bale, said stripping means comprising two cylindrical rollers which are disposed adjacent said feed bale where they are almost touching with each other and are rotatable in opposite directions.

9. An implement for feeding animals which comprises a supply channel for receiving wrapped feed bales, unwrapping means for removing a wrapper from a feed bale at an unwrapping site, cutting means for cutting fodder in the feed bale into dimensions suitable for consumption, and delivery means for delivering the fodder that has been cut into dimensions suitable for consumption to a feeding stall for the animals to be fed, said delivery means comprising a controllable nozzle.

10. An implement in accordance with claim 9 wherein said nozzle comprises separating means for intercepting substances in the fodder that are unfit for consumption.

11. An implement in accordance with claim 10 wherein said separating means comprises a magnet.

12. An implement in accordance with claim 11 wherein said magnet comprises an electromagnet.

13. An implement for feeding animals which comprises a feed channel which is configured to receive wrapped cylindrical shaped bales of fodder to be consumed by animals, unwrapping means for removing a wrapper from said bale at an unwrapping site, cutting means for cutting the fodder in said bale into dimensions suitable for consumption by the animals for whom said fodder is intended, a feeding stall, and delivery means for delivery said fodder that has been cut into dimensions suitable for consumption to said feeding stall for the animals to be fed said fodder that has been cut into dimensions suitable for consumption by such animals.

14. An implement in accordance with claim 13 wherein said supply channel is provided with control means for sequentially supplying one said bale at a time to said unwrapping means for removing said wrapper from said one bale.

15. An implement in accordance with claim 13 wherein said unwrapping means comprises control means for retaining a said bale at said wrapping site as it is being unwrapped and then releasing the unwrapped said bale to be received by said cutting means.

16. An implement in accordance with claim 13 wherein said unwrapping means comprises severing means for cutting said wrapper.

17. An implement in accordance with claim 13 wherein said unwrapping means comprises rotating means for rotating said bale about a substantially horizontal axis as it is being unwrapped.

18. An implement in accordance with claim 13 wherein said unwrapping means comprises stripping means for stripping the wrapper from said bale.

19. An implement in accordance with claim 13 wherein said unwrapping means comprises wrapper discharging means for discharging said wrapper.

20. An implement in accordance with claim 13 wherein said cutting means comprises at least one rotatable cutter.

21. An implement in accordance with claim 13 wherein said cutting means comprises at least one rotatable knife.

22. An implement in accordance with claim 13 wherein said cutting means comprises a row of cutting elements.

23. An implement in accordance with claim 13 wherein said implement is mobile.

24. Am apparatus for feeding animals which comprises a supply channel for receiving wrapped bales of fodder to be consumed by the animals, unwrapping means for removing a wrapper from a said bale at an unwrapping site, cutting means for cutting said bale after said wrapper has been removed therefrom into dimensions suitable for consumption by the animals for whom said fodder is intended, a feeding stall for feeding said fodder which has been cut into dimensions suitable for consumption by the animals for whom it is intended, and delivery means for delivering said fodder that has been cut into dimensions suitable for the consumption of said animals' for whom it is intended to said feeding stall where such animals are fed said fodder that has been cut into dimensions suitable for their consumption.

25. A method of feeding animals fodder from crop which has been formed into cylindrical bales which are wrapped in plastic wrappers, the method comprising supplying said bales to a channel that automatically delivers said bales to an unwrapping site, automatically removing plastic wrappers from said bales at said unwrapping site and conveying said bales to a cutting site, cutting said bales at said cutting site into dimensions suitable for consumption of the animals for whom said fodder is intended, and automatically delivering said fodder that has been cut into dimensions suitable for the consumption of the animals for whom it is intended to a feeding site where said animals for whom the fodder is intended are fed.

\* \* \* \* \*